Nov. 22, 1966   W. M. RIPPLE ET AL   3,286,810
APPARATUS FOR ARRANGING AND FEEDING ARTICLES
Filed Feb. 19, 1965   7 Sheets-Sheet 1

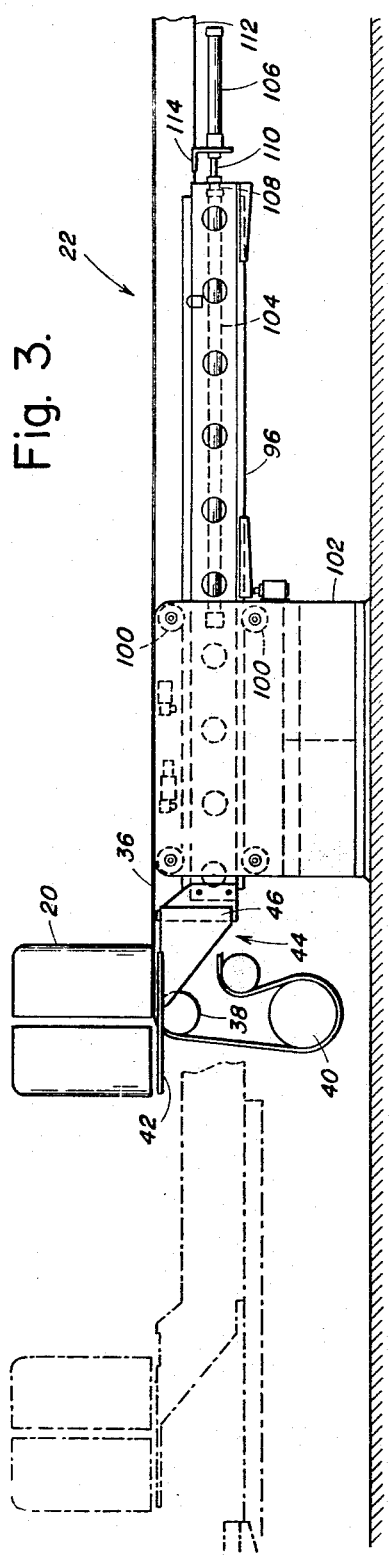
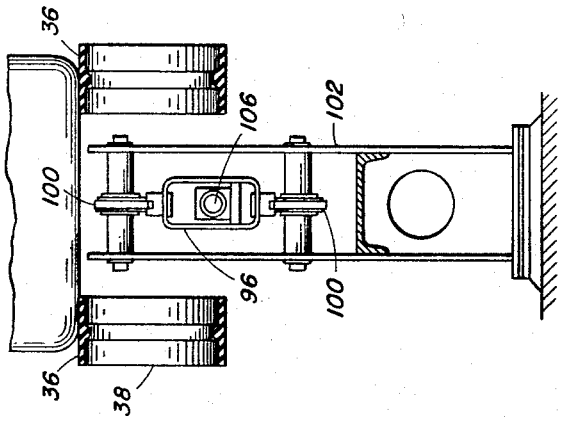

Nov. 22, 1966    W. M. RIPPLE ETAL    3,286,810
APPARATUS FOR ARRANGING AND FEEDING ARTICLES
Filed Feb. 19, 1965    7 Sheets-Sheet 3
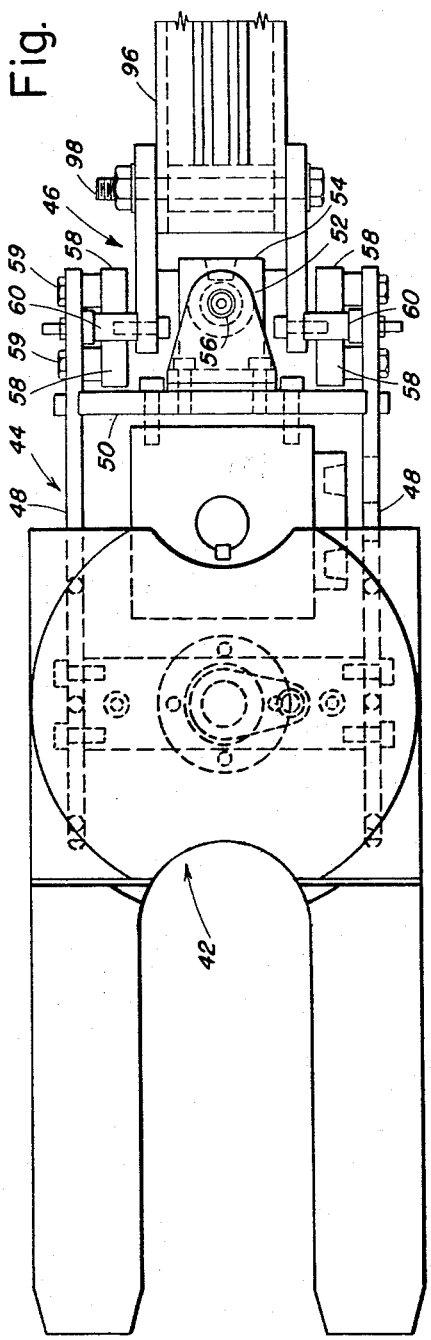
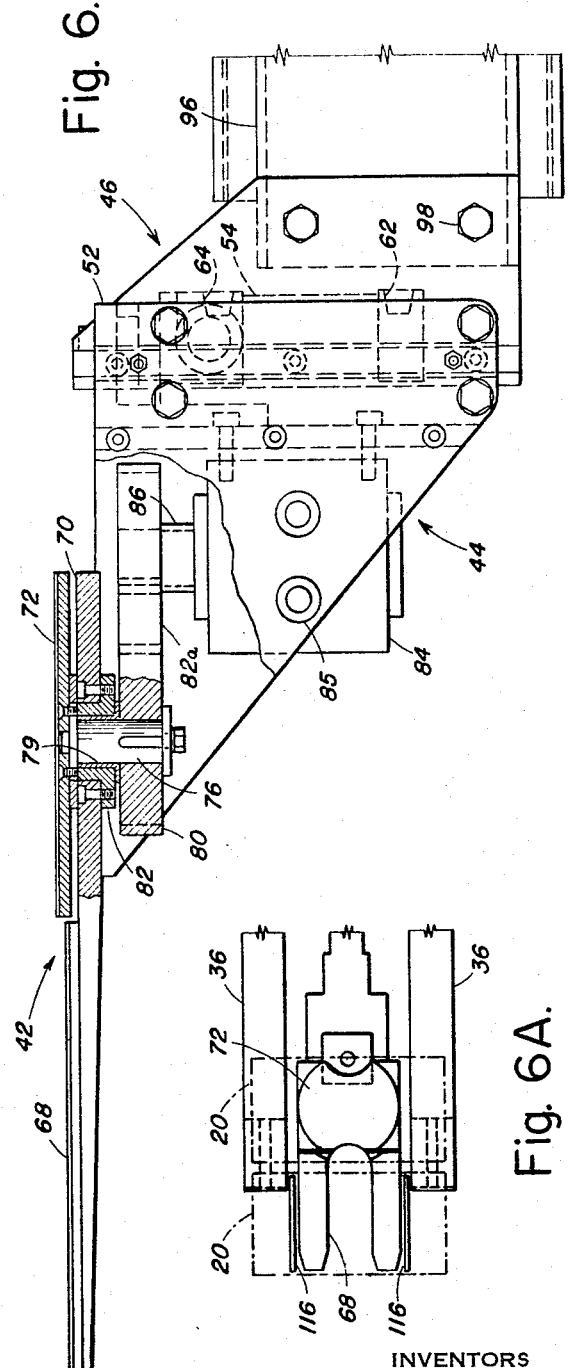
INVENTORS
William M. Ripple
Herbert J. Smith
BY *Frank J. Jordan*
ATTORNEY United States Patent Office 3,286,810
Patented Nov. 22, 1966

3,286,810
APPARATUS FOR ARRANGING AND FEEDING ARTICLES
William M. Ripple, Metairie, and Herbert J. Smith, New Orleans, La., assignors to American Radiator & Standard Sanitary Corporation, New York, N.Y., a corporation of Delaware
Filed Feb. 19, 1965, Ser. No. 434,008
10 Claims. (Cl. 198—33)

This invention relates in general to an apparatus for arranging and transferring articles from one conveyer to another, and more particularly to an apparatus operable to receive successive articles, rearrange them in pairs in back-to-back relationship, and thereafter transfer such pairs of articles to another conveyer.

The invention is particularly adaptable for handling green ceramic ware particularly water closet flush tanks which are sprayed and coated with an enamel glaze so that upon final firing thereof, the coating will harden and provide a smooth, hard and easy to clean surface.

Heretofore, green ceramic ware, e.g. water closet flush tanks, have been sprayed with enamel glaze manually with spray guns. Such spraying varied from individual to individual to that a uniform coating of the sprayed material was not always obtained. Also, the manual spraying resulted in the spray permeating the atmosphere and making it difficult for the workers to perform their job. In addition, the manual handling of the ceramic ware in transferring the ware to and from a spray booth was time consuming and burdensome to the workers.

Since these tanks are generally adapted to be used with the backs thereof mounted against a wall, it is not necessary to apply the coating of glaze material to the backs of the tank. According to the present invention, an apparatus for automatically performing the same is provided whereby pairs of tanks are placed in back-to-back relationship so that as they are carried through a spraying apparatus, the vertical walls, that is the front and sides of the tanks, can be sprayed while the backs, which face each other in close relationship remain uncoated. Thus instead of handling the tanks individually for spraying, they are handled in pairs to thereby increase the overall efficiency of the spraying process.

The present invention provides an apparatus which is operable to receive tanks from a straight line conveyer, rotate every second tank 180° and thereby place pairs of tanks back-to-back so that such pairs may be transferred to a rotary conveyer, the latter carrying each pair as a unit through various stations of a spray apparatus where the pairs of tanks are rotated about a vertical axis as a stationary spray nozzle directs the spray to the vertical walls of the tanks. A separate spray nozzle is employed to spray the covers which are carried in their normal position on the tanks.

It is therefore an object of the invention to overcome the aforesaid difficulties by providing an apparatus for handling, arranging articles to be coated, and transferring them to an automatic spray apparatus.

Another object of the invention is to provide an apparatus for receiving articles from one conveyer, arranging such articles in pairs in back-to-back relationship, and transferring such pairs to a spray apparatus.

Another object is to provide an apparatus for manipulating and handling articles as they are fed into a spray apparatus.

Other objects and features of the invention will appear as the description of the particular physical embodiment selected to illustrate the invention progresses.

For a better understanding of the present invention reference should be had to the accompanying drawings, wherein like numerals of reference indicates similar parts throughout the several views and wherein:

FIGURE 3 is a side elevation on a larger scale of the feed conveyer and the transfer mechanism feeding the tanks to the spray apparatus.

FIGURE 4 is an end view of FIG. 3 partially in section.

FIGURE 5 is a plan view of the transfer mechanism for arranging the tanks in pairs and transferring the tanks from the feed conveyer to the spray apparatus.

FIGURE 6 is an elevation of FIG. 5 partially in section.

FIGURE 6A is a plan view similar to FIG. 5 but on a smaller scale.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed is for the purpose of description and not of limitation.

Figure 1:
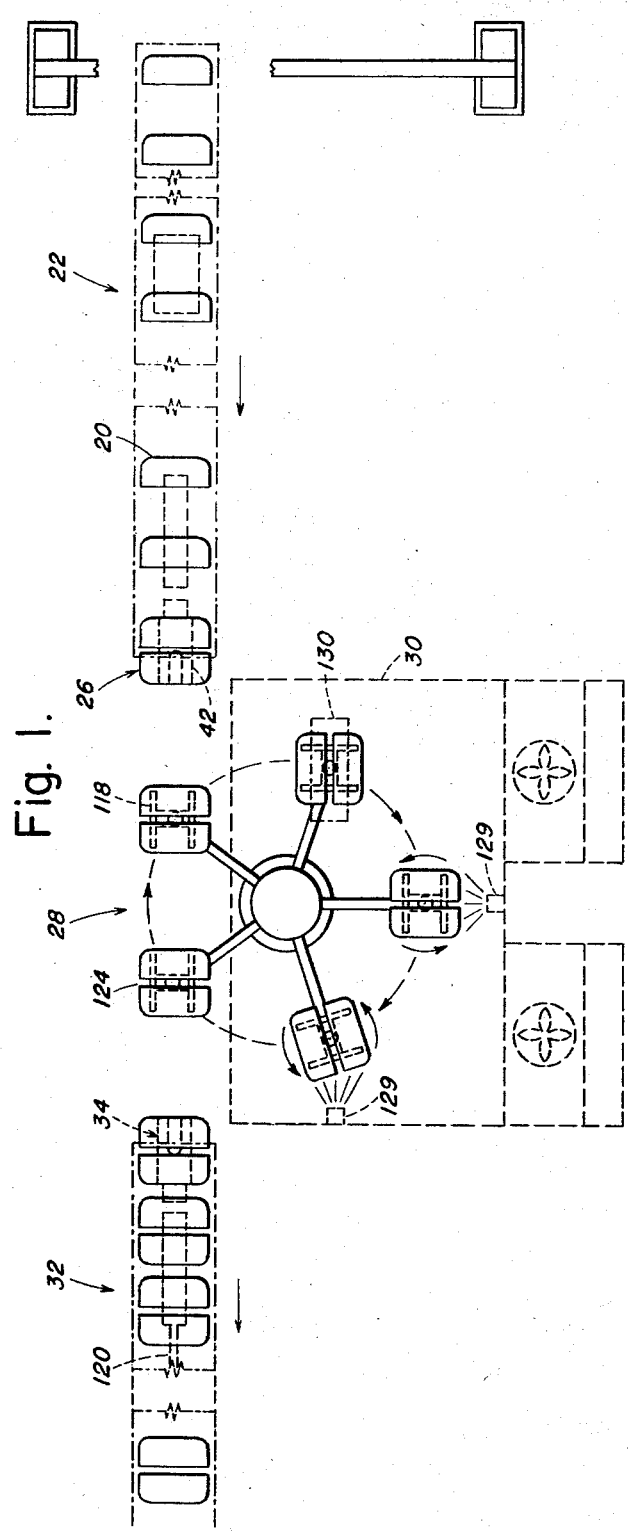
FIGURE 1 is a plan view of the present invention showing the path of movement of the tanks as they are fed to and moved from the spray apparatus.

Referring to the drawings, FIG. 1 shows the path of travel of the tanks as they are fed to and from a spraying apparatus. The tanks 20 to be sprayed with an enamel glaze are deposited on a feed conveyer indicated generally at 22 by any suitable means such as by a manipulator 24. The feed conveyer 22 conveys the tanks along a generally straight line to a transfer machine indicated generally at 26. The transfer machine 26 is operable to rotate every other tank 180° to place pairs of tanks back-to-back and thereafter transfer such pairs to a rotary conveyer indicated generally at 28. The rotary conveyer 28 receives the pairs of tanks and carries them through a spray booth 30 where the tanks are sprayed with an enamel glaze. As the pairs of tanks emerge from the spray booth 30, they are transferred from the rotary conveyer 28 to an exit conveyer indicated generally at 32 by means of the transfer mechanism 34.

The feed conveyer 22 may comprise a straight line belt conveyer comprising one or more endless belts 36 suitably carried on rollers 38 and powered by a power drive means 40. The conveyer 22 is adapted to be indexed periodically so that after the manipulator 24 deposits a tank 20 on the conveyer belts 36, the latter will be indexed one step to advance the tank and thereby provide an open space on the conveyer ready to receive the next tank from the manipulator 24. It will be seen, therefore, that with this arrangement the tanks are equally spaced on the conveyer 22.

The feed conveyer 22 advances these equally spaced tanks to the transfer device or means 26 which is located at the longitudinal end of the feed conveyer 22 and which comprises a platform 42 upon which the tanks are deposited and thereafter transferred to the rotary conveyer 28. Details of construction of the transfer machine 26 are best shown in FIGS. 5 and 6 wherein there is shown a frame 44 reciprocally movable in a vertical direction relative to another frame 46. The frame 44 comprises two spaced structural members 48 suitably joined, e.g. by a cross member 50. The cross member supports a lug 52 which extends rearwardly to overlie a power cylinder 54 carried on the frame 46. The operating cylinder 54 has a piston rod 56 connected to the lug 52 of the frame 44 such that actuation of the power cylinder 54 will raise and lower the frame 44 relative to the frame 46. Suitable guide means such as the rollers 58 (FIG. 5) are carried on the frame 44, such as by the bolts 59 to engage the guide ways 60 carried on the frame 46. The power cylinder 54 is provided with a suitable inlet and outlet 62 and 64 (FIG. 6) to supply and exhaust an operating fluid to the power cylinder.

Suitably mounted on the frame 44 is the platform 42 which has a forward portion 68 and a rear portion 70. The rear portion 70 of the platform mounts a rotatable platform 72. The platform 72 is slightly higher in elevation than the front portion 68 and is adapted to be rotated so that a tank carried thereon, may be rotated 180° as later described. In order to provide for this rotation, a shaft 76 rotatably supported in bearing 79 which is carried in a bushing 82 mounted on the rear portion 70 of the platform is affixed to the rotatable platform 72 and mounts a gear 80, the latter in turn mating with another gear 82a which is driven by a rotary power device 84 through the shaft 86. The rotary power device which is mounted on the frame 44 such as by the bolts 85 may be a hydraulic rotary torque actuator or Rotac as manufactured by the Brown and Sharpe Company. This rotary actuator 84 is operable to periodically rotate the gear 80 and in turn rotate the platform 72 180°.

From the above description it will be seen that the frame structure 44 may be raised and lowered by the power cylinder 54 relative to the frame 46 and that the platform 72 may be rotated by the rotary actuator 84.

The frame 46 which, as previously mentioned, carries the frame 44 for reciprocal movement, is carried by a longitudinally extending hollow beam or slide 96 suitably secured to the frame 46 by the bolts 98. The beam 96 is mounted for longitudinal movement and is accordingly supported and guided on rollers 100, the latter in turn being mounted on a base frame 102. Longitudinally movement of the beam 96 is achieved by a pair of power cylinders 104 and 106 having piston rods 108 and 110 respectively. The power cylinder 104 is secured to and carried within the beam 106 and its piston rod 108 extends rearwardly and is suitably secured to the piston rod 110 of the power cylinder 106, the latter in turn being fixed to the support frame 112 of the feed conveyer 22 by means of the bracket 114. It will be observed that with the two piston rods 108 and 110 connected to one another, that actuation of the power cylinder 106 will move the power cylinder 104 and the beam 96 as a unit since the hydraulic fluid in the cylinder 104 will prevent relative movement between the piston 108 and cylinder 104. In like manner, actuation of the power cylinder 104 will move the beam 96 longitudinally as the piston 108 is held stationary due to its connection to the piston rod 110 and due to the operating fluid in the cylinder 106 which prevents movement of the piston rod 110 therein. The reason and function of this relation of the two power cylinders will be set forth in the following description on the operation of the transfer machine.

Figure 7:
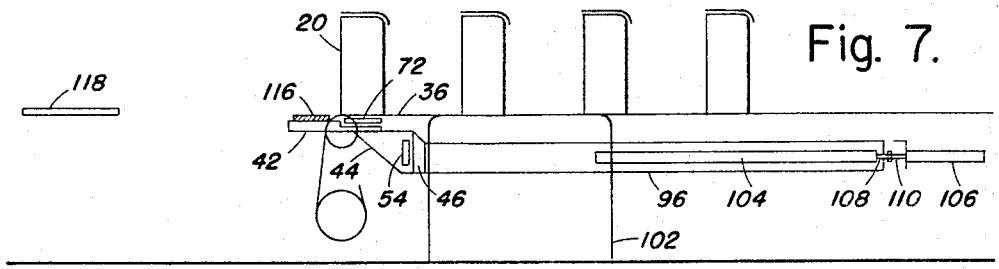
FIGURES 7 through 16 are schematic views showing step-by-step operation of the transfer mechanism transferring tanks from the conveyer to the spray apparatus.
Figure 8:
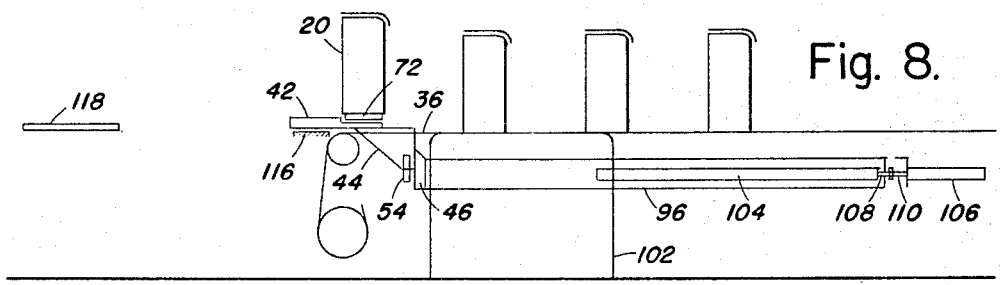

The operation of the transfer machine is best shown in FIGS. 7 to 16. FIG. 7 shows a tank 20 which has just been placed by the conveyor belt 36 to a position overlying the reciprocal platform 72. It will be recalled that the conveyer belts 36 consist of two spaced belts and the platform 42 is located between these two spaced belts. After the tank reaches the position shown in FIG. 7, the power cylinder 54 is actuated to lift the tank off the conveyer belts 36 to the position shown in FIG. 8. Thereafter, the rotary power device 84 is actuated to rotate the platform 72 180° as previously described.

Figure 9:
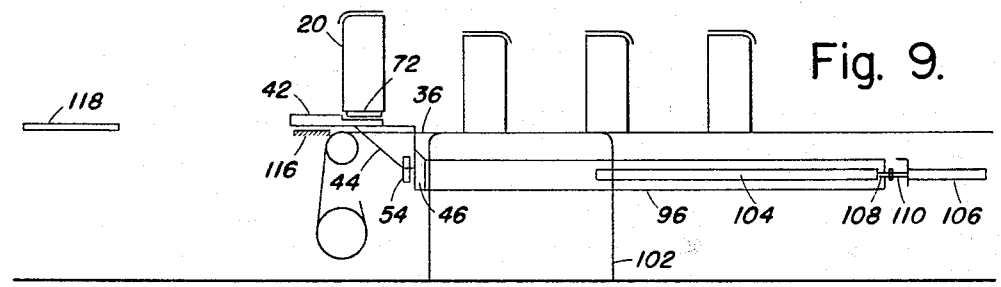
Figure 10:
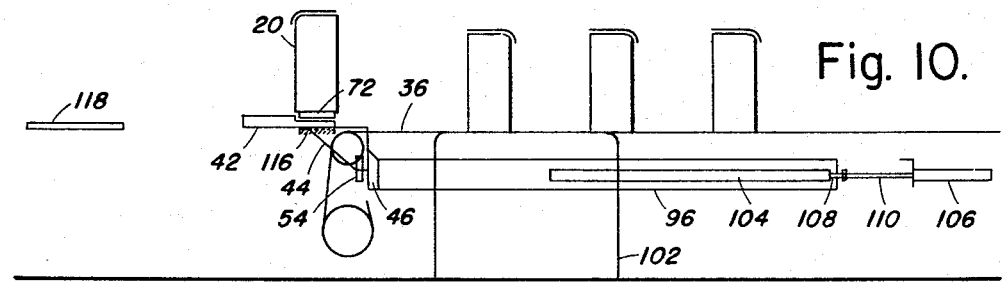
Figure 11:
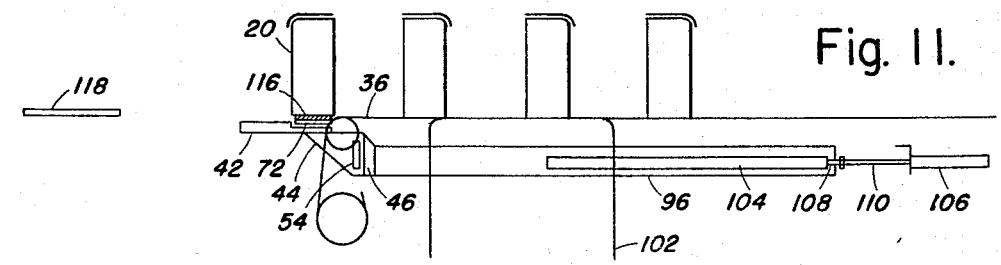

Upon rotation the tank 20 appears as shown in FIG. 9. The power cylinder 106 is then actuated to extend the beam 96 a relatively short distance, 10 inches for example, to the position shown in FIG. 10. It will be recalled that extension of the piston rod 110 moves the piston rod 108, cylinder 104, and beam 96 as a unit. Thereafter, the power cylinder 54 is actuated to lower the tank on a suitable stationary frame 116 (also see FIG. 6a). This frame 116 may be any suitable stationary member such as a bracket extending from the feed conveyer 22 to temporarily support the tanks 20 in the position shown in FIG. 11.

Figure 12:
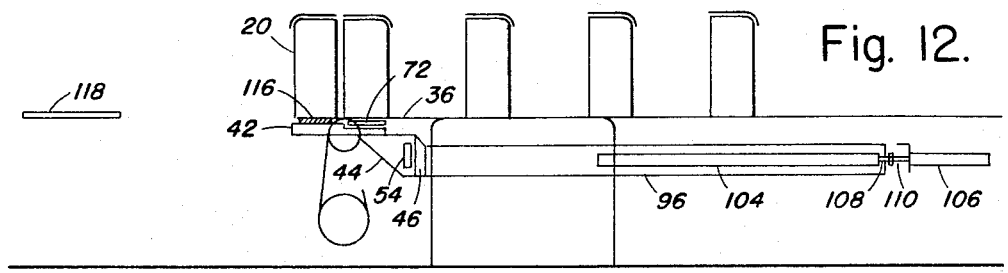
Figure 13:
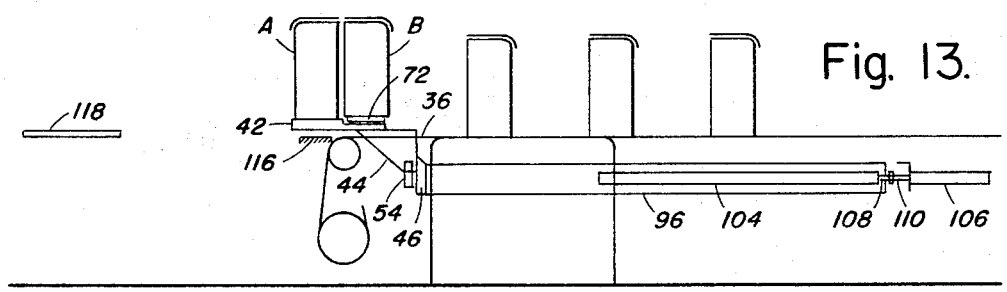

After the tanks is deposited on the frame 116 the power cylinder 106 is actuated to return the beam 96 to its prior unextended position as shown in FIG. 12. By the time the beam 96 is returned to its unextended position, a second tank has been placed in position over the reciprocal platform 72 by the conveyer belts 36 as shown in FIG. 12. In the next step, the frame 44 is again elevated relative to the frame 46 and beam 96 by the power cylinder 54 as previously described. As the frame 44 is elevated, the entire platform 42 including the reciprocal platform 72 will be raised as a unit to lift both tanks A and B, the forward tank A being lifted off the stationary frame 116 where it was previously temporarily depositioned and the rear tank B being lifted off the belt conveyer 36. The elevated position of the two tanks are shown in FIG. 13.

Figure 14:
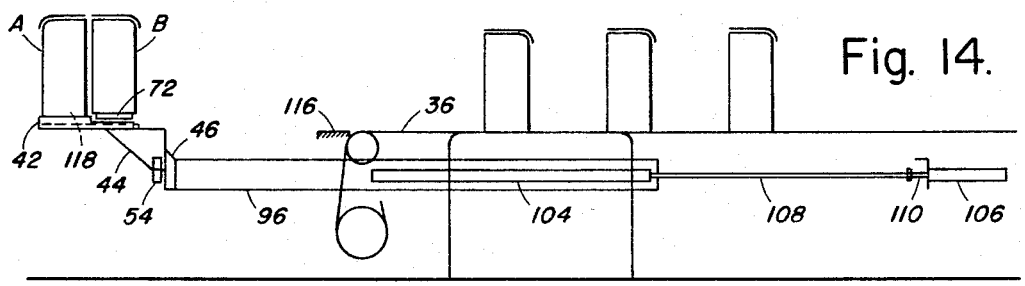
Figure 15:
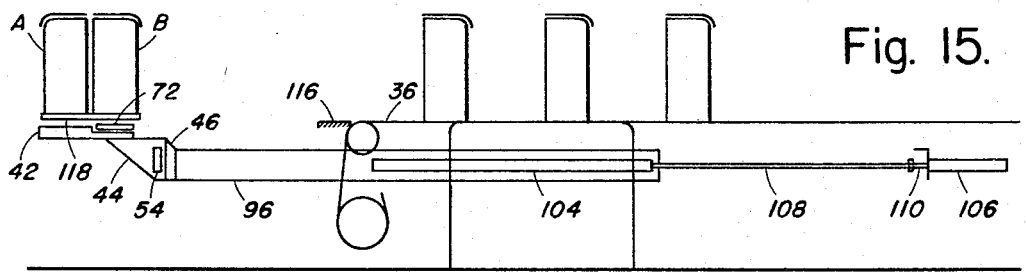
Figure 17:
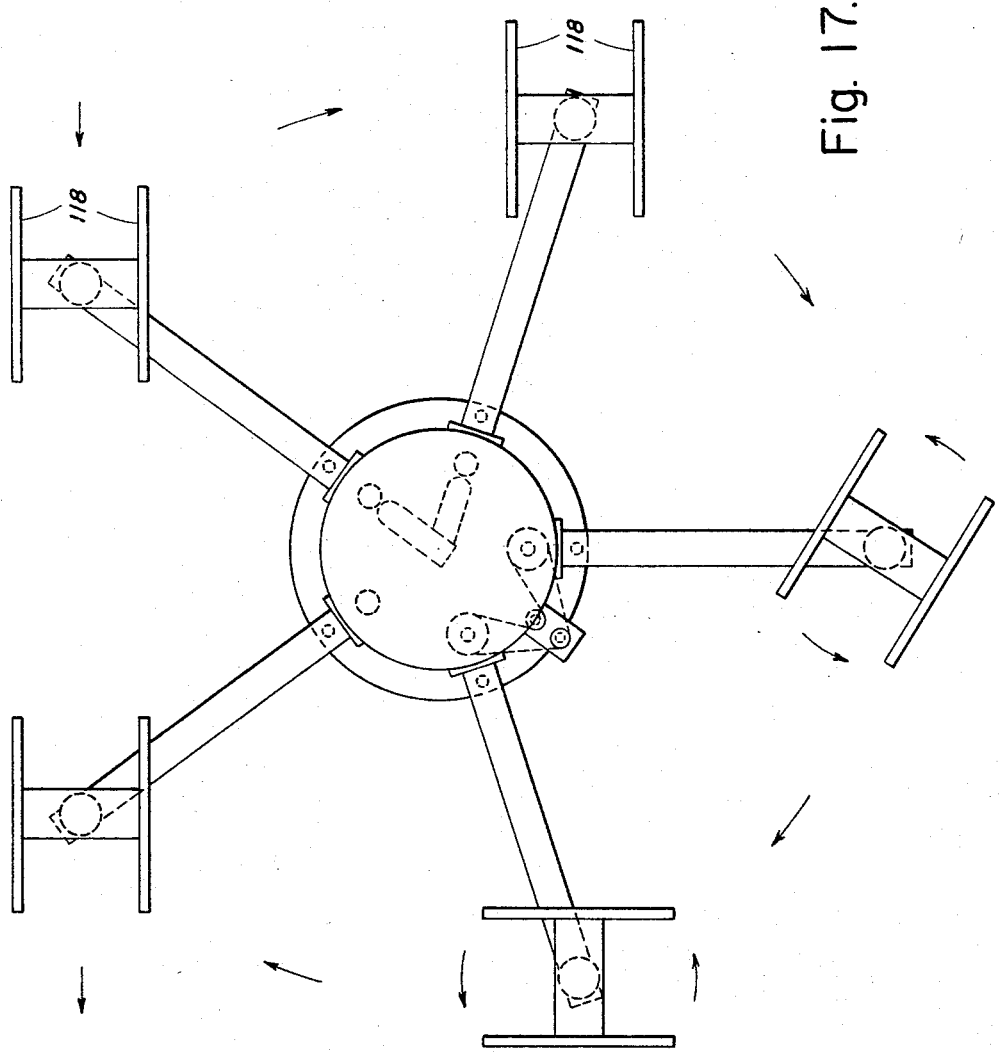
FIGURE 17 is a partial plan view of the rotary conveyer for moving the tanks through the spray apparatus.

While still in an elevated position, the power cylinder 104 is actuated to extend the beam 96 to the position shown in FIG. 14. As will be recalled from the previous description, the cylinder 104 is secured to the beam 96 and is carried with the beam 96 while the piston rod 108 is held in a stationary position due to its connection to the piston rod 110, the latter in turn being held stationary in the cylinder 106. After the beam has been extended to the position shown in FIG. 14, the operating cylinder 54 is actuated to lower the frame 44 relative to the frame 46 to deposit the tanks A and B on the support arms 118 of the rotary conveyer 28 as shown in FIG. 15. As shown in FIG. 17, the support arms 118 are spaced from one another so that the platform 42 can be accommodated therebetween.

Figure 16:
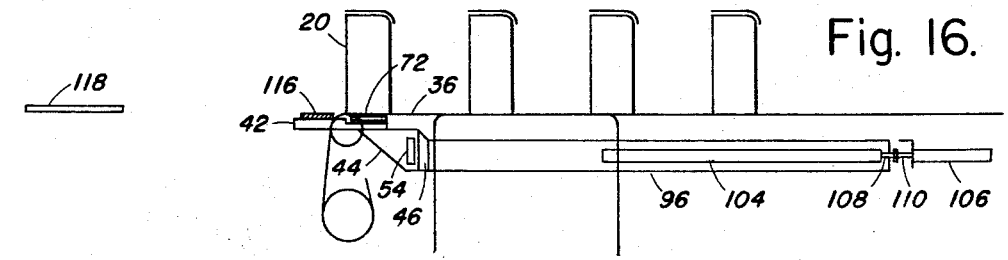

The operating cylinder 104 is thereafter actuated to return the beam 96 to the unextended position as shown in FIG. 16 whereupon the transfer mechanism is ready to repeat the cycle as the next tank 20 is conveyed to a position over the reciprocal platform 72 by the conveyer 36.

Figure 2:
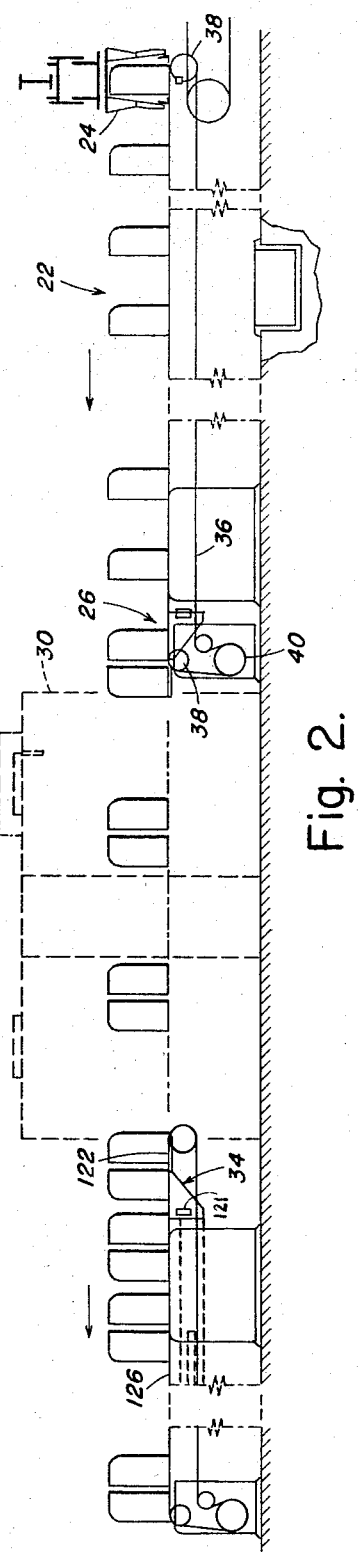
FIGURE 2 is an elevational view of FIG. 1.

The pair of tanks placed on the support arms 118 are then moved through the spraying machine as the rotary conveyer 28 carries the pair of tanks to the various stations in the spray booth. Upon exit from the spray booth, the tanks are removed from the rotary conveyer 28 by the transfer device 34. The transfer device 34 is similar to the transfer device 26 except that it only requires two operating cylinders. One of the cylinders 120 extends the platform 122 longitudinally from the position shown in FIG. 1 to a position underlying the two tanks located at the position indicated by the numeral 124. The platform 122 is then raised by a power cylinder 121 (similar to the power cylinder 54 for raising the platform 42 in FIG. 6) so that the platform 122 picks the two tanks off the support arms 118 of the rotary conveyer 28. The cylinder 120 is then retraced and the platform 122 lowered to deposit the pair of tanks on the belt conveyer 126 (FIG. 2).

The details of construction and operation of the rotary spray conveyor are covered in co-pending application Serial No. 434,085, filed February 19, 1965, for Rotary Conveyor Apparatus.

Figure 18:
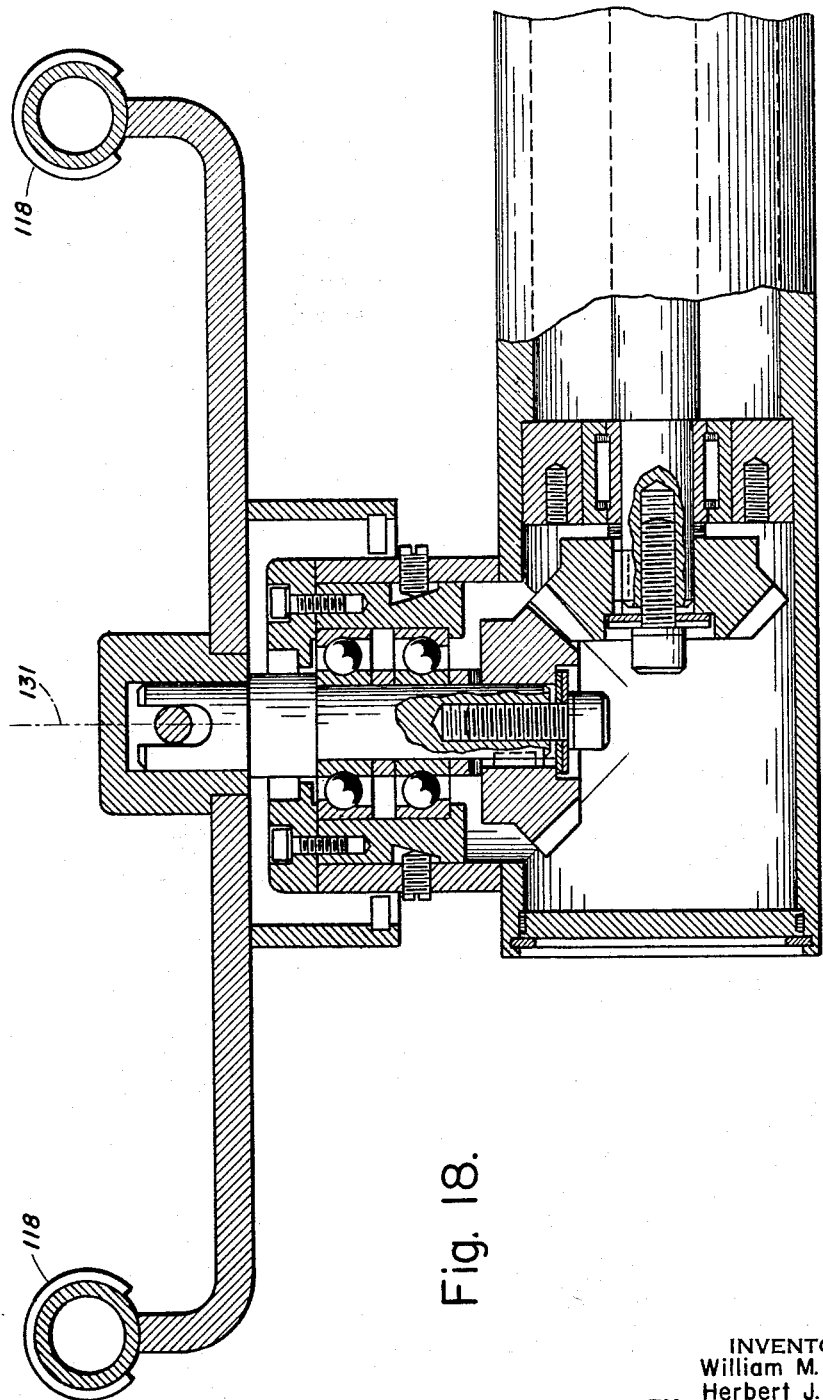
FIGURE 18 is an elevation view in section and on a larger scale of ends of the radial arms of the radial conveyer which carry the pairs of conveyers through the spray booth.

It will be observed from the description that the transfer device is operable to receive tanks as they are moved along a belt conveyer and thereafter mate the tanks in back-to-back relationship and transfer them to a rotary conveyer where the pairs of tanks are sprayed as a unit. The tanks move down the feed conveyer 36 all facing in the same direction, that is with their backs which do not require a spray coating, facing forward in the direction of advancement. When the first tank of a pair reaches the transfer mechanism 26 it is turned 180° and thereafter mated with the next tank, which is not turned, in back-to-back relationship. Thus when these two tanks are transferred to the spray booth 30, each pair of tanks are passed through spraying stations by the rotary conveyer 28. A pair of tanks are rotated as a unit about a vertical axis 131 (FIG. 18) as the spraying means 129 (FIG. 1) located in the spray booth 30 to the sides of the tanks sprays an even coating of glaze material thereon. At one station in the spraying booth an overhead spraying apparatus 130 may be provided to coat the two tanks covers. The overhead spraying apparatus is more fully covered in co-pending application Serial No. 433,861, filed February 19, 1965, for Spraying Apparatus.

From the above description it will be apparent that the apparatus of the present invention functions to receive tanks all facing in the same direction from a straight line conveyer and rotate every other tank 180° to provide pairs of tanks in back-to-back relationship and thereafter transfer such pairs to a rotary conveyer which passes the tanks to various spraying stations in a spray booth. Since the backs of the tanks do not require a spray coating, the tanks are arranged in pairs so that they may be sprayed as a unit to facilitate and increase the efficiency in the application of such spray material thereon.

While various parts of the mechanism have been described as being driven by operating cylinders or rotary motors, it is within the scope of the invention to use hydraulic or pneumatic cylinders or rotary motors or to use other types of electrical or fluid driven motors to actuate the moving parts. The electric circuitry with the various limit switches and sensing devices have not been illustrated since it is felt that these may be readily supplied by an artisan skilled in the art, and are not essential for the understanding of the instant invention.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. A device for arranging a series of successive articles movable in a line and facing the same direction into back-to-back pairs comprising:
   (a) a platform means deposed adjacent the end of said line of articles for successively receiving the article movable in said line,
   (b) said platform means including a first portion and a second portion for receiving said articles,
   (c) means for effecting rotation of said second portion to rotate the article supported thereon,
   (d) a fixed article support to receive the article supported on said second portion,
   (e) and means operatively connected to said platform means to effect vertical displacement and lateral displacement thereof toward and away from said fixed article support whereby said platform means is moved toward said fixed support when said platform is in the vertically displaced position thereof and away from said fixed article support in the lowered position thereof whereby said article is deposited on said fixed support.

2. A device for handling articles movable successively in predetermined spaced relationship in a line wherein each article is said line is oriented in the same direction comprising:
   (a) a platform means having a first portion and a relatively movable second portion disposed in the path of said moving line whereby said second portion is adapted to receive one of said articles moving in said line,
   (b) means for effecting rotation of said second portion to rotate the article supported thereon,
   (c) a fixed support disposed adjacent said platform means,
   (d) means for vertically displacing and laterally displacing said platform means and article supported thereon to position the same over said fixed support,
   (e) said vertical displacement means when de-energized effecting the lowering of said platform means to rest said article thereon on said fixed support,
   (f) and said lateral displacing means effecting movement of said platform means away from said fixed support to preposition the same for receiving the next succeeding article.

3. A device for arranging a series of successive articles, each facing in the same direction and movable in predetermined spaced relationship into back-to-back pairs comprising:
   (a) a platform means for successively receiving the articles in said line,
   (b) said platform means including a first portion and a second portion, each of said portions being adapted for supporting an article thereon respectively,
   (c) means effecting rotation of said second portion to rotate a first article supported thereon,
   (d) vertically displacing means to raise and lower said platform means,
   (e) laterally displacing means operatively connected to said platform means to effect limited lateral displacement of said platform means,
   (f) a fixed article support disposed below said second portion in the laterally disposed position of said platform to receive the article supported on said second portion when said platform means is lowered thereto whereby said article faces in the opposite direction,
   (g) said lateral displacing means returning said platform means to its initial position whereby said second portion is adapted to receive the next succeeding article,
   (h) said verticle displacement means elevating the first article off said fixed support and said next article on said second portion,
   (i) and means to effect lateral displacement of said platform to transfer said paired articles therefrom.

4. An article handling device for arranging successive articles movable in a line in predetermined spaced relationship into back-to-back pairs, and for transferring said back-to-back pairs therefrom comprising:
   (a) a base,
   (b) slide means,
   (c) means for mounting said slide on said base for reciprocating movement relative to said base,
   (d) a drive means for effecting reciprocation of said slide relative to said base,
   (e) a frame structure carried on said slide for reciprocal movement therewith,
   (f) means for connecting said frame for relative vertical movement with respect to said slide,
   (g) said latter means including a piston and cylinder assembly, the movable piston of which is operatively connected to said frame structure to effect vertical displacement thereof,
   (h) a platform carried on said frame for vertical movement therewith,
   (i) said platform including a first portion fixed to said frame, and
   (j) a second portion, said second portion being rotatable with respect to said first portion.

5. An article handling device for arranging articles in pairs in a predetermined relationship with respect to one another comprising:
   (a) a base, (b) a beam,
(c) means for reciprocating said beam relative to said base between a first and second extended and retracted position,
(d) a first frame means fixed to said beam,
(e) a second frame means,
(f) means for connecting said second frame means for relative movement with respect to said first frame means,
(g) a platform carried by said second frame means for movement therewith,
(h) said platform including a first portion and a second portion, and
(i) means operatively connected to said second portion for effecting limited rotation thereof with respect to said first portion.

6. An article handling device for arranging a series of successively movable articles, each facing in the same direction into back-to-back pairs comprising:
(a) a base,
(b) a beam,
(c) means for reciprocating said beam relative to said base between a first and second extended and retracted position,
(d) a first frame means fixed to said beam,
(e) a second frame means,
(f) means for operating said second frame means for relative vertical movement with respect to said first frame means,
(g) a platform carried by said second frame means for movement therewith,
(h) said platform including a first portion and a second portion,
(i) means operatively connected to said second portion for effecting limited rotation thereof with respect to said first portion,
(j) a fixed article support adjacent said platform,
(k) said beam reciprocating means when actuated being moved to a first extended position to position said raised platform over said fixed support whereby said article thereon is transferred thereto.

7. A device for handling articles movable successively in predetermined spaced relationship in a line wherein each of said articles in said line is oriented in the same direction and for arranging succeeding pairs of said articles in back-to-back relationship to effect a transfer of said paired back-to-back articles therefrom comprising:
(a) a platform means having a first portion and a relatively movable second portion disposed in the path of said movable line whereby said second portion is adapted to receive one of said articles moving in said line,
(b) means effecting vertical displacement of said platform,
(c) means for effecting rotation of said second portion to rotate the article supported thereon,
(d) a fixed article support disposed adjacent said first portion and slightly above the same,
(e) means operatively connected to said platform means for effecting lateral displacement thereof when said second platform is in the vertically displaced portion thereof to position the article supported thereon over said fixed support,
(f) said vertical displacement means when de-energized effecting the lowering of said platform to rest said article thereon onto said fixed support,
(g) said lateral displacing means effecting movement of said platform away from said fixed support to reposition the same for receiving the next succeeding article to be paired with said first mentioned article in back-to-back relationship,
(h) and means for effecting laterally displacement of said platform means in the raised position thereof to a maximum extended position to transfer said paired articles carried thereon therefrom.

8. A device for handling flush tanks of water closets travelling successively in a line at predetermined equally spaced intervals wherein each of said tanks is faced in the same direction to effect an arrangement in which succeeding pairs of said tanks are disposed in back-to-back relationship in contemplation of transferring said tanks so paired to another operation comprising:
(a) a base,
(b) an endless conveyer means including a pair of endless belts disposed in spaced side-by-side relationship,
(c) means for driving said belts intermittently in a given direction,
(d) means for successively placing on said belt a plurality of tanks at regularly spaced intervals, said tanks being all facing in the same direction whereby said line of tanks is advanced toward one end of said conveyer means,
(e) transfer means disposed adjacent said one end of said conveyer for receiving, arranging and transferring said articles therefrom,
(f) said transfer means including a slide reciprocally mounted on said base for movement toward and away from said one end of the conveyer means,
(g) means operatively connected to said slide for effecting reciprocal movement thereof to a first and second extended position,
(h) a first frame structure fixed to the end of said slide,
(i) a second frame structure,
(j) means for connecting said second frame structure for relative reciprocal movement with respect to said first frame structure,
(k) a platform means adapted to form a support for a pair of tanks carried on said second frame structure, said platform means having a first portion and a second portion disposed between said spaced belts,
(l) a drive means adapted to effect rotation of said second portion,
(m) and means for operatively connecting said second portion in driving relationship with said drive means to effect rotation of the article supported thereon.

9. A device for handling water closet flush tanks movable successively in a line at predetermined equally spaced intervals wherein each of said tanks is facing in the same direction to effect an arrangement in which succeeding pairs of said tanks are disposed in back-to-back relationship in contemplation of transferring said tanks so paired to another operation comprising:
(a) a base,
(b) an endless conveyer means including a pair of endless belts disposed in spaced side-by-side relationship,
(c) means for driving said belts intermittently in a given direction,
(d) means for successively placing on said belt a plurality of tanks at regularly spaced intervals, all facing in the same direction whereby said line of tanks is advanced toward one end of said conveyor means,
(e) transfer means disposed adjacent said one end of said conveyer for receiving, arranging and transferring said articles therefrom,
(f) said transfer means including a slide reciprocally mounted on said base for movement toward and away from said one end of the conveyer means,
(g) a drive means operatively connected to said slide for effecting reciprocal movement thereof to a first and second extended position,
(h) a first frame structure fixed to the end of said slide for movement therewith,
(i) a second frame structure,
(j) means for connecting said second frame structure for relative vertical reciprocal movement with respect to said first frame structure, (k) a platform means adapted to receive the paired tanks carried on said second frame structure, said platform means having a first portion for supporting one tank and a second portion for supporting another tank disposed between said spaced belts,
(l) a rotating drive means,
(m) means for operatively connecting said second portion in driving relationship with said rotating drive means,
(n) a fixed article support adjacent said platform means,
(o) said slide drive means being operative to extend said slide to a first portion to locate the article carried on said second portion over said fixed support whereby said article is deposited thereon when said platform is lower and said slide returns to reposition said platform to receive the next succeeding article to be paired with said first mentioned article.

10. An article handling device receiving, arranging and transferring articles in a predetermined manner comprising:
(a) a transfer means including a laterally reciprocating slide means,
(b) drive means operatively connected to said slide means to effect lateral displacement thereof between an extended and unextended position,
(c) said drive means including a pair of piston and cylinder assembly, the respective cylinder being coaxially disposed and the piston of said assemblies being connected to a common piston rod whereby said assemblies are successively actuated to control the lateral displacement of said slide to a first and second position,
(d) a frame means connected to one end of said slide to be carried laterally therewith, said frame means including a first section fixed to said slide and a second section vertically movable relative said first section,
(e) means operatively connected to said frame for effecting vertical reciprocal movement of said second frame section relative to said first frame section,
(f) means for guiding said second frame section during vertical movement thereof relative to said first frame section,
(g) a platform means carried on said second frame section to reciprocate therewith,
(h) said platform including a first portion and a second portion,
(i) a fixed article support disposed adjacent and slightly above said first platform portion in the lowered position of said platform, and
(j) a rotational drive means operatively connected to said second portion to effect limited rotation thereof.

References Cited by the Examiner
UNITED STATES PATENTS
2,872,018   2/1959   Sorge _____ 198—33.2

EVON C. BLUNK, *Primary Examiner.*
RICHARD E. AEGERTER, *Examiner.*